UNITED STATES PATENT OFFICE.

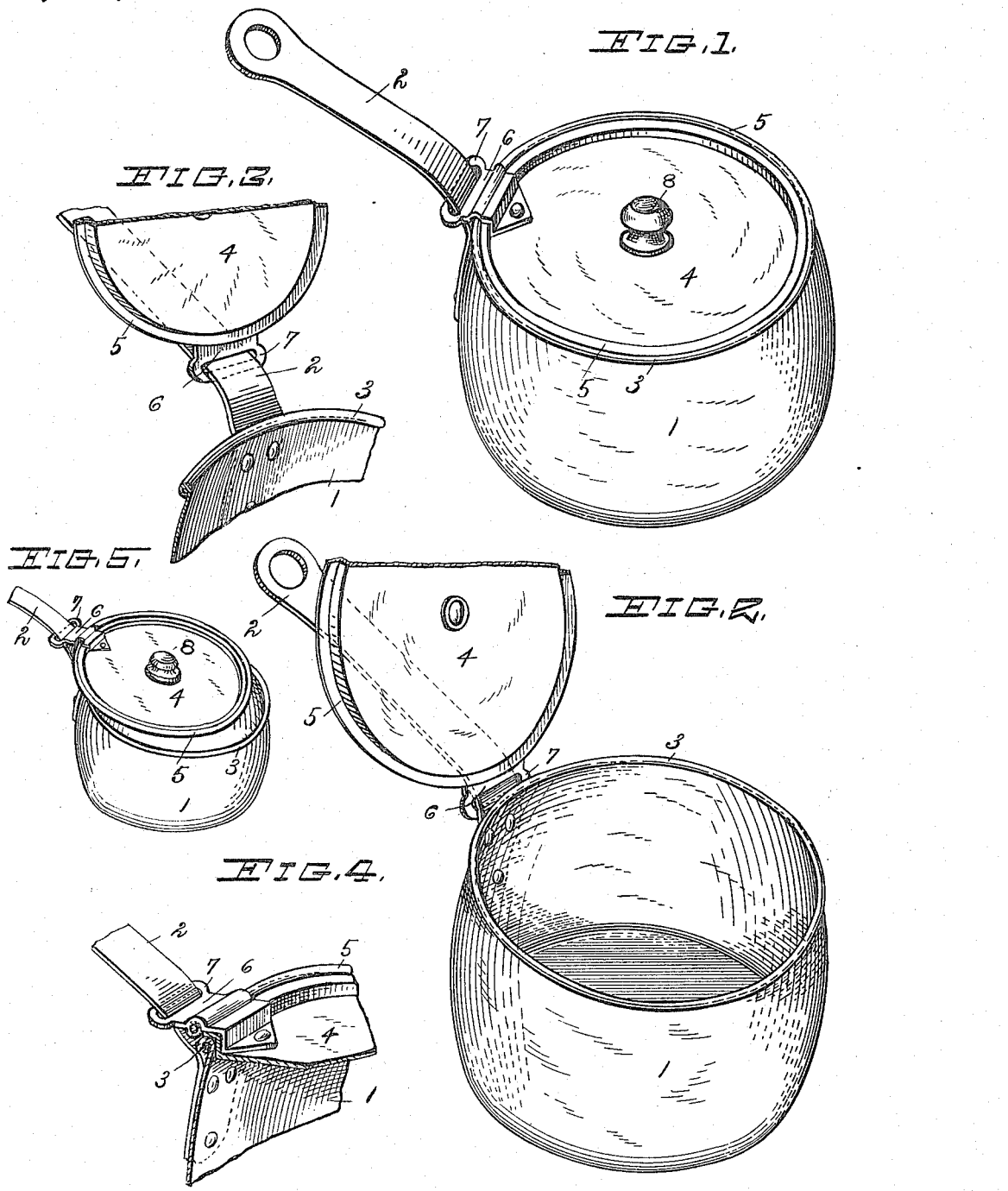

LEON WARD AND JOSEPH V. MILLER, OF MASSILLON, OHIO.

POT-LID.

1,145,723.  Specification of Letters Patent.  Patented July 6, 1915.

Application filed July 20, 1914. Serial No. 851,870.

*To all whom it may concern:*

Be it known that we, LEON WARD and JOSEPH V. MILLER, citizens of the United States, residing at Massillon, in the county of Stark and State of Ohio, have invented a new and useful Improvement in Pot-Lids, of which the following is a specification.

The invention relates to lids for pots and other vessels having a handle projecting from one side of the rim; and the object of the improvement is to provide means on one edge of the rim for engaging the handle to hold the lid in upright position thereon at the rim of the pot, or elsewhere along the length of the handle.

In the use of pots and other cooking utensils, it is frequently inconvenient to remove the lid therefrom and hold it in the hand while inspecting or attending to the contents of the pot; and a suitable place for resting the lid is not always available. Furthermore, when pots of several sizes are used, unnecessary time is consumed in selecting a corresponding lid, when the same are stored separately from the pot, and frequently a separate lid is lost or mislaid. These difficulties are overcome, and the objects of the present invention are attained, by providing a peripherally extending plate on the rim of the lid with a slot therein adapted to loosely engage the handle of the pot, so that the lid may be rotated into reclined position upon the rim of the pot, or into upright position upon the handle thereof.

A preferred embodiment of the invention, thus briefly set forth, is illustrated in the accompanying drawing, forming part hereof, in which—

Figure 1 is a perspective view of a pot with the improved lid thereon; Fig. 2, a similar view showing the lid rotated into upright position upon the handle of the pot adjacent to the rim thereof; Fig. 3, a fragmentary view showing the lid upon the handle of the pot somewhat removed from the rim thereof; Fig. 4, a fragmentary view showing details of construction; and Fig. 5, a perspective view showing the lid slightly raised from its seat on the rim of the pot.

Similar numerals refer to similar parts throughout the drawing.

The pot 1 is provided with a handle 2 which may be flat in cross section as shown, or of any other suitable shape. The handle preferably curves first abruptly and then more gradually upward and outward from the rim 3 of the pot in the usual manner well known in the art.

The lid 4 is provided with a suitable peripheral rim 5, adapted to be seated upon the rim of the pot, and is also provided with the plate 6 on one side extending peripherally substantially in the plane of the lid, in which plate is formed the slot 7 of suitable size and shape so that its edges will loosely engage the upper and lower sides of the handle 2 of the pot. The lid is also preferably provided with the central handle 8 for raising and lowering the lid upon the pot.

The peripherally extending plate 6 is rigidly formed on or secured to the lid, so that the lid cannot be flexed with reference to the plate; and it is evident that the loose engagement of the plate slot with the handle of the pot, permits the lid to be rotated downward into reclined position to seat its rim upon the rim of the pot, as shown in Fig. 1. It is also evident that the lid may be rotated into upright position, the loose engagement of the plate slot with the handle serving as a hinge, until the lid passes slightly beyond the vertical position, whereupon the sides of the slot will bear against opposite sides of the handle and hold the lid in upright positon, as shown in Fig. 2. And finally, the loose engagement of the plate slot with the handle, permits the lid to be moved by sliding along the handle and to be supported thereon at various points in its length, or to be removed entirely over the end of the handle.

In the use of the pot, the improved lid may be removed from its handle for cleaning or other purposes, but it is preferred to normally engage the lid upon the handle of the pot, so that the two parts together can be hung upon the same hook. By these means it is evident that the lid cannot be mislaid; that a lid of proper size is always present with the utensil without any delay for sorting lids to find one that fits; space is saved in storing the pot and lid by hanging the same upon a single hook; there is no need for hunting a place upon a crowded stove for resting the lid while examining or removing the contents of the pot; and finally the lid when rotated uprightly upon the handle, serves as a shield for preventing hot steam from burning the hand upon the handle, while draining water or emptying the contents from the pot. Furthermore, the lid in its reclined position can be slightly rested from its seat upon the rim of the pot by sliding the slotted plate along the handle of the pot, as shown in Fig. 5, which is a very desirable position of the lid for giving a slight vent for permitting steam to escape from the pot without fully opening the same or entirely exposing its contents.

We claim:

A pot having a handle extending upward and outward from its rim, and a lid for the pot having a plate extending laterally in the plane of the lid, said plate being rigid with respect to the lid and having an aperture therein with edges loosely engaging the upper and lower sides of the handle for gripping it to hold the lid at various places in either upright or reclined position thereon.

LEON WARD.
JOSEPH V. MILLER.

Witnesses:
EARL C. CARLSON,
LOUISE M. CORBY.

Copies of this patent may be obtained for five cents each, by addressing the "Commissioner of Patents, Washington, D. C."